United States Patent [19]

Kanazawa

[11] Patent Number: 4,524,842
[45] Date of Patent: Jun. 25, 1985

[54] FLEXIBLE COUPLING FOR PROVIDING VARIABLE RATE STEERING

[75] Inventor: Hirotaka Kanazawa, Hiroshima, Japan

[73] Assignee: Mazda Motor Corporation, Japan

[21] Appl. No.: 473,999

[22] Filed: Mar. 10, 1983

[30] Foreign Application Priority Data

| Mar. 17, 1982 | [JP] | Japan | 57-43330 |
| Mar. 19, 1982 | [JP] | Japan | 57-44858 |
| Apr. 21, 1982 | [JP] | Japan | 57-67877 |
| Apr. 21, 1982 | [JP] | Japan | 57-67878 |

[51] Int. Cl.³ .............................................. B62D 1/20
[52] U.S. Cl. ...................... 180/132; 74/470; 180/143; 180/148; 267/150; 464/112
[58] Field of Search .............. 180/132, 148, 141, 143; 267/150; 74/470; 464/62, 81, 112

[56] References Cited

U.S. PATENT DOCUMENTS

| 1,711,187 | 4/1929 | Triulzi | 464/112 |
| 1,895,751 | 1/1933 | Bulow | 464/62 |
| 3,528,265 | 9/1970 | Brinson | 464/62 |
| 3,839,883 | 10/1974 | Braess | 74/470 |
| 4,251,194 | 2/1981 | Petersen | 180/132 |
| 4,310,063 | 1/1982 | Nishikawa | 180/143 |

Primary Examiner—Joseph F. Peters, Jr.
Assistant Examiner—Kenneth R. Rice
Attorney, Agent, or Firm—Murray, Whisenhunt & Ferguson

[57] ABSTRACT

A power steering device for a vehicle comprises a steering wheel, a steering linkage operatively connecting the steering wheel to dirigible wheels of the vehicle and a power assisting device inserted into the steering linkage to assist the steering force of the steering wheel. A steering shaft of the steering linkage rotated with the steering wheel to transmit the steering force from the steering wheel to the power assisting device is divided into first and second parts. A pair of coil springs are inserted between the first and second parts of the steering shaft to connect them with each other and is adapted to be elastically deformed to produce a rotational displacement between them when the steering wheel is rotated. A set load is placed on the coil spring so that the coil spring can be elastically deformed only when the steering force from the steering wheel exceeds a predetermined value.

12 Claims, 14 Drawing Figures

F I G. 1
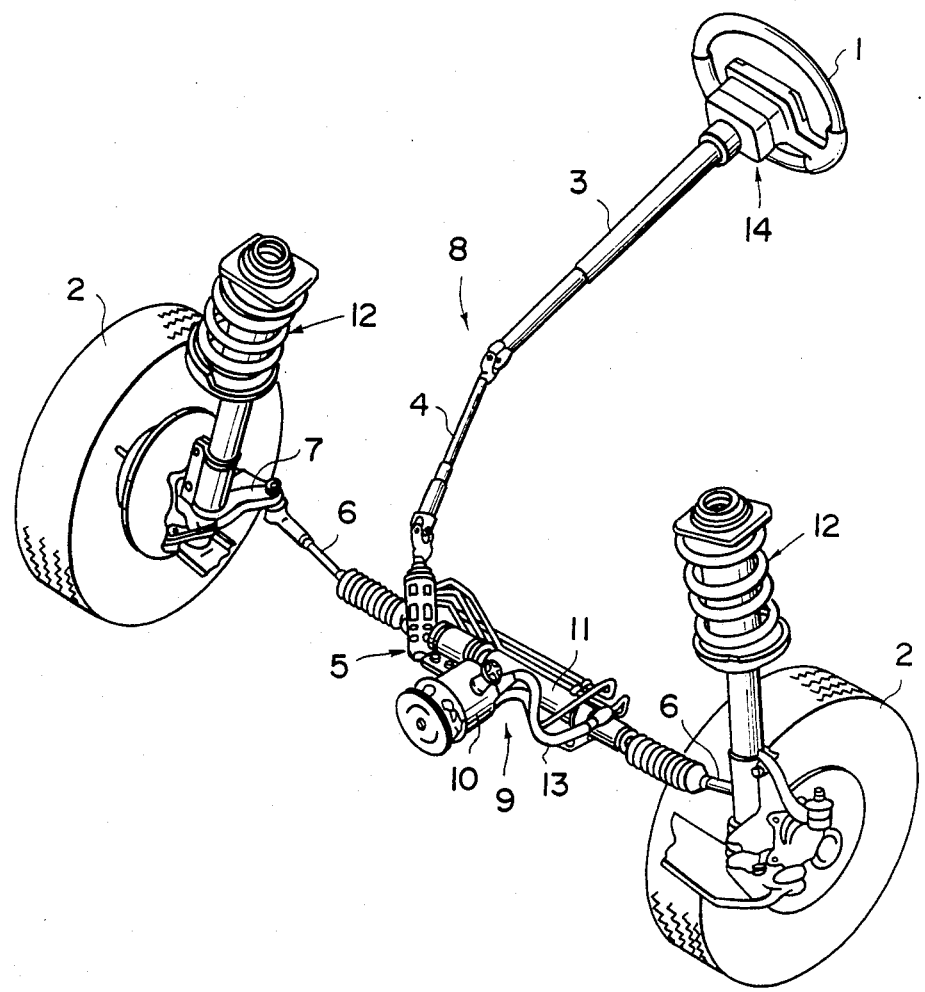

FLEXIBLE COUPLING FOR PROVIDING VARIABLE RATE STEERING

BACKGROUND OF THE INVENTION

1. Field of the Invention

This invention relates to a power steering device for vehicles, and more particularly to a variable-steering-ratio power steering device in which the steering ratio, the ratio of the rotating angle of the steering wheel to the turning angle of the dirigible wheels is variable relative to the speed of the vehicle.

2. Description of the Prior Art

There has been known a power steering device which is provided with a power assisting device (hereinbelow referred to simply as "power assist") in the steering linkage thereof to reduce the effort required to rotate the steering wheel. Generally, the steering ratio is preferred to be relatively small while the vehicle is at rest or moving at a low speed so that the dirigible wheels can be turned by a relatively large angle with a small rotating angle of the steering wheel, thereby reducing the steering effort of the operator. On the other hand, the steering ratio is preferred to be relatively large while the vehicle runs at a high speed in order to prevent oversteering and to minimize the influence of sidewinds, road shocks and the like, thereby providing steering stability. However, in the conventional power steering devices in which the steering ratio has a fixed value over almost the entire speed range, it is impossible to meet both the requirements. Therefore, the steering ratio is conventionally fixed at an intermediate value as a compromise between the two requirements.

Recently, there has been proposed in U.S. Pat. No. 4,310,063 a power steering device in which the steering ratio is made variable according to the speed of the vehicle. In the power steering device, resilient means in the form a torsion bar is inserted into a portion of the steering linkage between the steering wheel and the power assist which portion transmits the steering force from the steering wheel to the power assist as a rotary motion thereof. When the steering wheel is rotated, the torsion bar is elastically deformed to produce a rotational displacement between portions connected to opposite ends thereof, the amount of the elastic deformation of the torsion bar depending upon the steering force of the steering wheel whereby the steering ratio is changed according to the speed of the vehicle. That is, when the vehicle is running at a low speed, the torsion bar is elastically deformed by a relatively small amount whereby the steering ratio is kept relatively small, while when the vehicle is running at a high speed, the torsion bar is elastically deformed by a larger amount whereby the steering ratio is made larger.

However, the power steering device as disclosed in the above U.S. Patent is disadvantageous in that the free play range or the insensitive range at the central portion of the steering range is excessively widened since the free play due to the elasticity of the resilient means inserted into the linkage is added to the mechanical free play in the linkage itself, e.g., the free play in the joints of the linkage and the free play in mesh of a rack and a pinion. Excessive free play in the steering system adversely affects the response in compensating for external disturbances and in recovery of the front wheels when running path is changed.

A further disadvantage of the power steering device of the above U.S. Patent is that the variable range of the steering ratio is relatively narrow since the torsion bar employed as the resilient means has a small allowable twisting angle (amount of the rotational displacement) and the degree of the freedom in selecting the characteristics of the torsion bar is limited. Further, the divice is complicated in structure and is large in size.

Further, in the power steering device of the above U.S. Patent, when an excessive load is exerted on the resilient means as is the case when the steering wheel is operated while the vehicle is at rest or the steering wheel is sharply rotated to avoid an obstruction in the road, the resilient means may be broken. In order to avoid the possibility of breakage of the resilient means, a restraining means is provided to limit the amount of rotational displacement of the steering linkage to a predetermined angle, thereby limiting the load exerted onto the resilient means. However, the restraining means involves a problem in that the steering effort required to operate the steering wheel abruptly becomes heavier to give the operator a discontinuous feeling in steering when the restraining means comes into action.

Generally, the steering ratio is preferred to be large when the vehicle is running at a high speed in order to prevent oversteering. However, expert drivers or those who are fond of sharp steering response may want the steering ratio to be small even when the vehicle is running at a high speed. Further, different steering ratio characteristics will be appreciated when driving in town and in the country. Thus, it will be convenient if the steering ratio characteristics can be adjusted freely according to driver's choice.

SUMMARY OF THE INVENTION

In view of the foregoing observations and description, the first object of the present invention is to provide a variable-steering-ratio power steering device in which the free play of the steering wheel is made appropriate, whereby the steering response near the central portion of the steering range is highly improved.

The second object of the present invention is to provide a variable-steering-ratio power steering device in which the steering ratio can be varied over a wide range, whereby the degree of freedom of design is enlarged, and which is simple in its structure and compact in size.

The third object of the present invention is to provide a variable-steering-ratio power steering device which is provided with a restraining means for limiting the rotational displacement in the steering linkage to prevent breakage of the steering linkage and in which the discontinuous feeling in steering when the restraining means begins to act is minimized.

The fourth object of the present invention is to provide a variable-steering-ratio power steering device in which the steering ratio characteristics can be freely adjusted according to the driver's choice.

The first object of the present invention can be accomplished by applying a set load onto the resilient means inserted into the steering linkage to reduce the free play due to the elasticity thereof, thereby limiting the insensitive range at the central portion of the steering range.

More particularly, the present invention provides in one aspect a power steering device comprising a steering wheel; a steering linkage which operatively connects the steering wheel to dirigible wheels of the vehicle so that the dirigible wheels can be turned as the steering wheel is operated to steer the vehicle; a power assist inserted into the steering linkage to assist the steering force of the steering wheel; the steering linkage having between the steering wheel and the power assist a rotating portion which is rotated with the steering wheel to transmit the steering force of the steering wheel to the power assist, and being divided into first and second parts; a resilient means which connects said first and second parts of the rotating portion with each other and is adapted to be elastically deformed to produce a rotational displacement between the first and second parts when the steering wheel is rotated; and a restricting means for applying a set load to the resilient means so that the resilient means can be elastically deformed to produce the rotational displacement between said two parts only when the steering force from the steering wheel exceeds a predetermined value.

In one preferred embodiment of the present invention, at least a pair of coil springs are used as the resilient means. The coil springs are disposed so that their central axes are in a plane substantially perpendicular to the rotational axis of said rotating portion and so that they are elastically deformed by rotation of the rotating portion in opposite directions.

By using coil springs instead of the torsion bar as the resilient means, the allowable range of the rotational displacement according to the steering force of the steering wheel can be substantially enlarged, whereby the steering ratio can be varied over a wider range. The second object of the present invention can thus be accomplished.

In another preferred embodiment of the present invention, a restraining means is provided to limit the rotational displacement between the first and second parts of the rotating portion to a predetermined angle in order to prevent breakage of the resilient means, and at the same time there is used a resilient means having non-linear elasticity, namely an elastic coefficient which increases with increasing rotational displacement, whereby the discontinuous feeling in steering when the restraining means begins to act is minimized. Thus the third object of the present invention is accomplished.

In still another preferred embodiment of the present invention, an adjustment means is provided to change the elastic properties of the resilient means, e.g., the spring constant thereof, or the value of the set load applied thereto. The adjustment means permits the driver to change the elastic properties of the resilient means to obtain desirable steering ratio characteristics according to his choice. The fourth object of the present invention can be thus accomplished.

BRIEF DESCRIPTION OF THE DRAWINGS

FIG. 1 is a perspective view showing a power steering device in accordance with an embodiment of the present invention.

DESCRIPTION OF THE PREFERRED EMBODIMENTS

Figure 2:
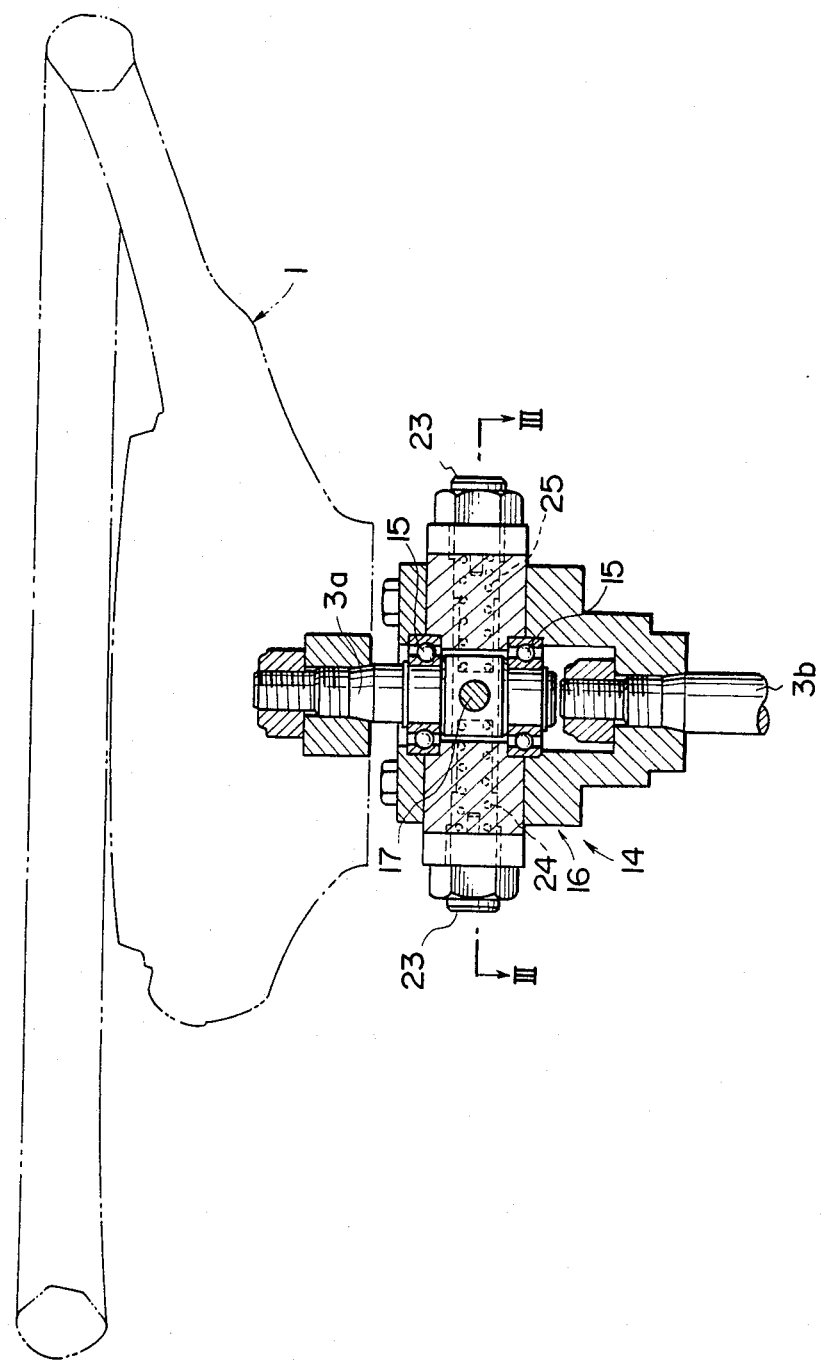
FIG. 2 is an enlarged cross sectional view of a part of the power steering device shown in FIG. 1.

In FIG. 1 which shows a first embodiment of the present invention, a steering wheel 1 is operatively connected with right and left front wheels 2 by way of a steering linkage 8. The steering linkage 8 comprises an upper steering shaft 3 connected to the steering wheel 1 at the upper end thereof, a lower steering shaft 4 connected to the lower end of the upper steering shaft 3 via a universal joint, a rack-and-pinion type steering gear 5 which converts rotational movement of the upper steering shaft 3 transmitted thereto via the lower steering shaft 4 into a linear movement in the transverse direction of the car body, the steering gear 5 being connected to the lower end of the lower steering shaft 4, and a pair of (right and left) tie rods 6 which are connected to the right and left ends of the steering gear 5, respectively. The right and left tie rods 6 are further connected to right and left steering knuckles 7 supporting the front wheels 2. A power assist 9 is associated with the rack of the steering gear 5. The power assist 9 comprises an oil pump 10 which is driven by the engine (not shown) of the vehicle to generate oil pressure, and a cylinder 11 driven by the oil pressure from the oil pump 10 when the steering action of the steering wheel 1 is detected. The operation of the power assist 9 and the operation of the steering linkage 8, except for that of the upper steering shaft 3, are substantially the same as those of the corresponding parts of the conventional power steering device and therefore will not be described in detail here.

Reference numerals 12 and 13 in FIG. 1 indicate suspensions for the right and left front wheels 2 and an oil pipe for the oil pump 10, respectively.

Figure 3:
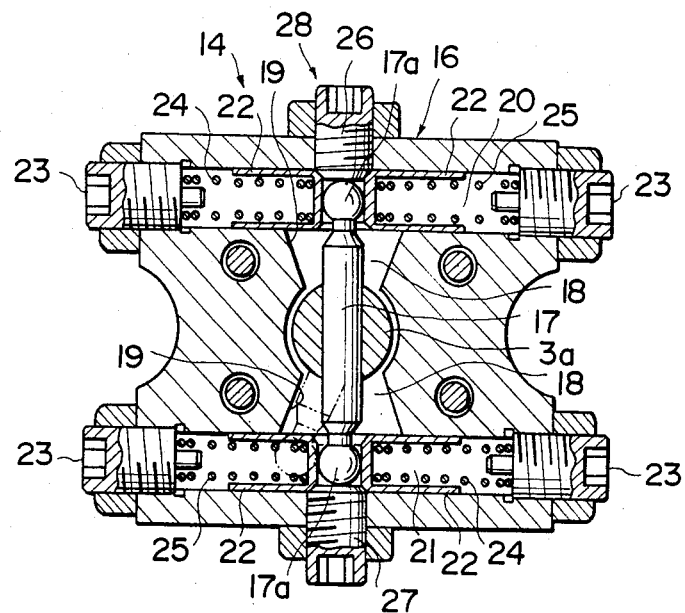
FIG. 3 is a cross sectional view taken along line III—III in FIG. 2.

The upper steering shaft 3 is divided into upper and lower parts 3a and 3b which are connected with each other by means of a coupling 14 as shown in FIG. 2. The structure of the coupling 14 is shown in detail in FIGS. 2 and 3. The upper end portion of the upper part 3a is fixedly connected to the steering wheel 1 to rotate therewith and the lower end portion of the upper part 3a is rotatably supported by a pair of bearings 15 mounted on a coupling body 16. A bore is formed in the lower end portion of the upper part 3a between the bearings 15 to extend perpendicular to the longitudinal axis or the rotational axis of the upper steering shaft 3. An engaging pin 17 is snugly received in the bore so that opposite end portions of the pin 17 project from the bore perpendicularly to the rotational axis of the upper steering shaft 3 as clearly shown in FIG. 3. The engaging pin 17 is provided with a pair of spherical heads 17a at the respective ends thereof. The upper end portion of the lower part 3b of the upper steering shaft 3 is fixedly connected to the lower portion of the coupling body 16 to rotate with the coupling body 16. The coupling body 16 is further provided at an intermediate portion thereof with a pair of sector cutaway portions 18 through which the end portions of the engaging pin 17 extend. The side walls of the cutaway portions 18 form stopper shoulders 19 which limit rotary movement of the pin 17 within a predetermined angle determined by the included angle of the sector cutaway portions 18. The coupling body 16 is further provided with a pair of spring receiving bores 20 and 21 which extend in parallel to each other and each of which extends substantially in the direction of the tangential movement of the spherical heads 17a of the engaging pin 17. An adjustment screw 23 is screwed into each end of the spring receiving bores 20 and 21. A pair of opposed collars 22 are slidably inserted into each of the spring receving bores 20 and 21 to abut against the spherical head 17a of the engaging pin 17 on opposite sides thereof. The collars 22 respectively inserted into the left side of the spring receiving bore 20 and the right side of the spring receiving bore 21 are urged toward the spherical heads 17a on opposite ends of the pin 17 by first coil springs 24. The collars 22 respectively inserted into the right side of the bore 20 and the left side of the bore 21 are urged toward the respective spherical heads 17a by second coil springs 25. That is, the first coil springs 24 are adapted to be elastically deformed pushed by the respective spherical heads 17a when the engaging pin 17 is rotated in the counterclockwise direction in FIG. 3, while the second coil springs 25 are adapted to be elastically deformed pushed by the respective spherical heads 17a when the engaging pin 17 is rotated in the clockwise direction in FIG. 3. As can be seen from the description above, the four coil springs 24 and 25 are positioned so that their longitudinal axes are in a plane substantially perpendicular to the upper steering shaft 3 and extend substantially in the direction the tangential movement of the heads 17a. Thus, the upper and lower parts 3a and 3b of the upper steering shaft 3 are operatively connected with each other via two pairs of coil springs 24 and 25, the first coil springs 24 and the second coil springs 25 being adapted to be elastically deformed by rotation of the upper part 3a in opposite directions.

The coil springs 24 and 25 have non-linear spring characteristics, the purpose of which will be described hereinafter.

Stopper pins 26 and 27 project into the spring receiving bores 20 and 21, respectively, opposed to the respective heads 17a of the engaging pin 17. The stopper pins 26 and 27 abut against the inner ends of the collars 22 to limit inward movement of the collars, thereby limiting extension of the coil springs 24 and 25 urging the collars 22. The stopper pins 26 and 27 constitute restricting means 28 which associates with the adjustment screws 23 to compress the coil springs 24 and 25 with a predetermined pressure therebetween, thereby applying a predetermined set load to the coil springs 24 and 25. The set load can be changed by operating the adjustment screws 23 as will be described later. When the steering force of the steering wheel 1 is smaller than a set value corresponding to the applied set value, the upper part 3a of the upper steering shaft 3 and the engaging pin 17 cannot be rotated with respect to the lower part 3b and the coupling body 16, i.e., no rotational displacement is produced between the upper and lower parts 3a and 3b of the steering shaft 3, and the upper and lower parts 3a and 3b are integrally rotated together with each other. When the steering force of the steering wheel 1 exceeds the set value, the upper part 3a and the engaging pin 17 are rotated with respect to the lower part 3b and the coupling body 16 overcoming the set load to elastically deform the coil springs 24 or 25, whereby a rotational displacement according to the steering force is produced between the upper and lower parts 3a and 3b.

Now the operation of the power steering device of this embodiment will be described in more detail. The operation of the power steering device when the steering wheel 1 is rotated to left or in the counterclockwise direction will be described by way of example. When the steering wheel 1 is rotated in the counterclockwise direction with a steering force larger than the set value, the engaging pin 17 fixedly connected to the steering wheel 1 via the upper part 3a of the upper steering shaft 3 is rotated counterclockwisely with respect to the lower part 3b in a plane perpendicular to the upper steering shaft 3 overcoming the resilient force of the first coil springs 24 with the spherical heads 17a of the pin 17 pushing the collars 22 outwardly. Thus the first coil springs 24 are compressed or elastically deformed to produce a rotational displacement between the upper and lower parts 3a and 3b of the upper steering shaft 3 according to the steering force of the steering wheel 1. Thereafter, the lower part 3b of the upper steering shaft 3 is rotated together with the upper part 3a via the first coil springs 24 and the coupling body 16, with the lower part 3b being retarded with respect to the upper part 3a by an angle determined by the amount of the rotational displacement which depends upon the steering force of the steering wheel. The rotary movement of the lower part 3b of the upper steering shaft 3 is transmitted to the steering gear 5 through the lower steering shaft 4 and then converted into linear movement in a direction transverse of the vehicle body. The linear movement is transmitted to the front wheels 2 to turn them with the assistance of the power assist 9.

Figure 4:
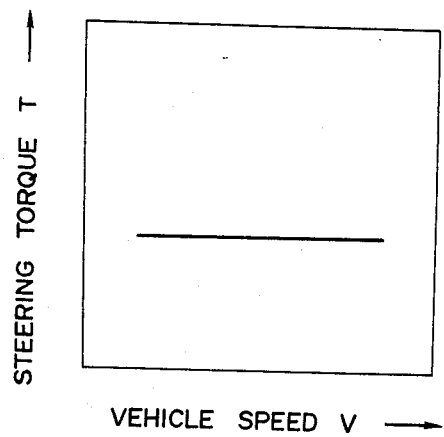
FIG. 4 is a graph showing the relation between the steering torque and the vehicle speed when the lateral acceleration is constant.

In steering devices provided with a power assist, typically, the steering torque T required to rotate the steering wheel 1 is substantially constant irrespective of speed of the vehicle so long as lateral acceleration G is constant, as shown in FIG. 4. In power steering devices which are not provided with means for producing a rotational displacement like that of the coupling 14 in the embodiment shown in FIGS. 1 to 3, the steering angle $\theta$ of the steering wheel and the steering angle $\gamma$ of the front wheels corresponding thereto are in certain ratio to each other irrespective of the speed of the vehicle and both the steering angles $\theta$ and $\gamma$ have a substantially linear relation with the lateral acceleration, the inclination of which depends upon vehicle speed: large at low speed and small at high speed. In case of the steering device without the coupling 14, the steering ratio $R_0$ is constant and equal to $\theta/\gamma$ ($R_0 = \theta/\gamma$ ... constant).

In case of the power steering device of this embodiment, the rotational displacement angle $\theta_\delta$ produced in the coupling 14 increases as the steering torque T increases until the steering torque T reaches a predetermined value. When the steering torque T exceeds the predetermined value, the engaging pin 17 in the coupling 14 abuts against the stopper shoulders 19 and therefore the rotational displacement angle $\theta_\delta$ is fixed at a constant value. The relation between the steering torque T and rotational displacement angle $\theta_\delta$ will be described later with reference to FIG. 6. The arrangement is such that the engaging pin 17 does not abut against the stopper shoulder 19 in normal steering operation except when an abrupt steering force or an abnormally high load is applied to the steering wheel 1 or when the steering wheel 1 is rotated while the vehicle is at rest.

Accordingly in the power steering device of this embodiment, the overall steering angle $\theta_{TOTAL}$ is equal to the sum of $\theta$ and $\theta\delta$ ($\theta_{TOTAL} = \theta + \theta\delta$). Thus, the resulting steering ratio R is equal to $\theta_{TOTAL}/\gamma$.

Therefore, the steering ratio (R)l at low speed and the steering ratio (R)h at high speed with the lateral acceleration assumed constant are as follows.

$$(R)l = \frac{(\theta_{TOTAL})l}{(\gamma)l} = \frac{(\theta)l + (\theta\delta)l}{(\gamma)l} = \frac{(\theta)l}{(\gamma)l} + \frac{(\theta\delta)l}{(\gamma)l}$$

$$(R)h = \frac{(\theta_{TOTAL})h}{(\gamma)h} = \frac{(\theta)h + (\theta\delta)h}{(\gamma)h} = \frac{(\theta)h}{(\gamma)h} + \frac{(\theta\delta)h}{(\gamma)h}$$

Since $$\frac{(\theta)l}{(\gamma)l} = \frac{(\theta)h}{(\gamma)h} = R_0$$

and the steering torque T is substantially constant when the lateral acceleration G is constant, $(\theta\delta)l = (\theta\delta)h = \theta\delta$. Accordingly, the steering ratios (R)l and (R)h become as;

$$(R)l = R_0 + \frac{\theta\delta}{(\gamma)l}$$

$$(R)h = R_0 + \frac{\theta\delta}{(\gamma)h}.$$

Figure 5:
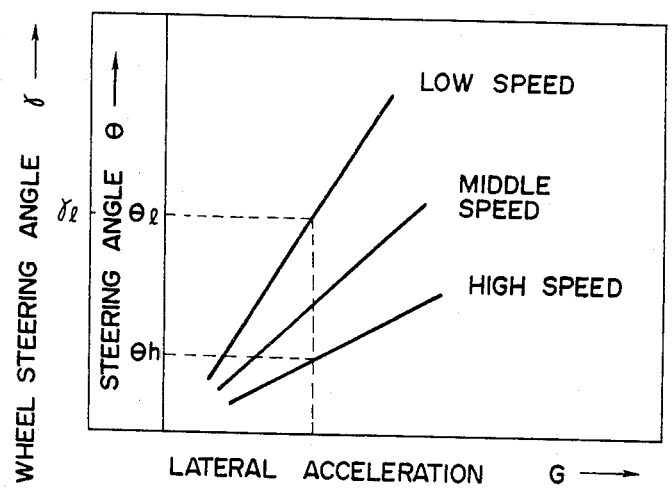
FIG. 5 is a graph showing the relation of the steering angle of the steering wheel and the steering angle of the dirigible wheels to the lateral acceleration in the case of the power steering device without resilient means.

From FIG. 5, it is clear that $(\gamma)l > (\gamma)h$. Therefore, the relation between the steering ratios (R)l and (R)h becomes as;

(R)l < (R)h.

Figure 7:
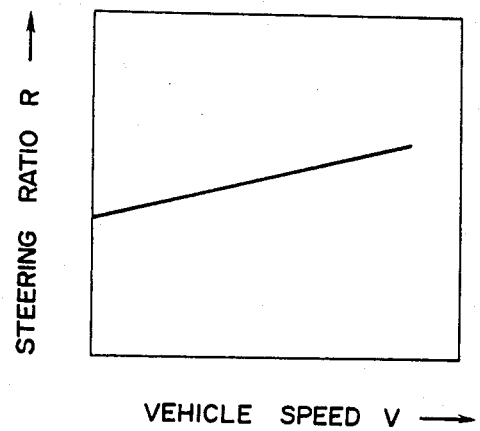
FIG. 7 is a graph showing the relation of the steering ratio to the vehicle speed in the steering device shown in FIG. 1.

That is, the steering ratio is kept small when the vehicle is running at low speed and kept large at high speed as shown in FIG. 7. In the above description, the lateral acceleration is assumed to be constant because drivers have a tendency to make a turn in such a manner that a constant lateral acceleration is generated irrespective of the vehicle speed.

Thus, when the vehicle runs at a low speed, the front wheels 2 can be steered at large angles by a small angle of steering of the steering wheel 1, since the steering ratio is small, and vice versa. Hence, in accordance with the above-described arrangement of the present invention, the driver's effort in turning the steering wheel at a low speed can be reduced and, at a high speed the oversteering can be prevented and the straight-running stability can be enhanced.

Figure 8:
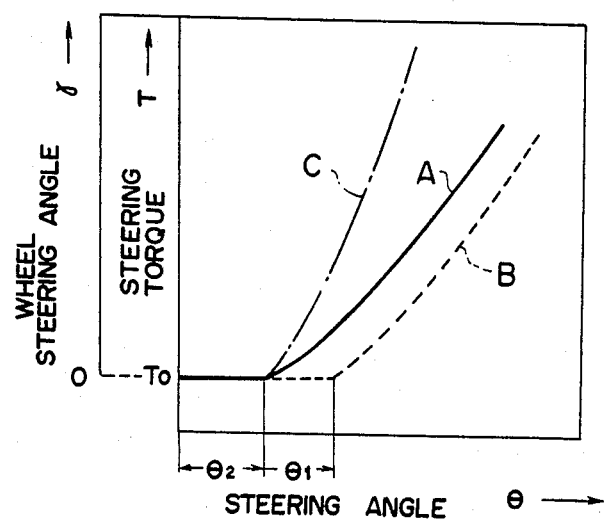
FIG. 8 is a graph showing the relation of the steering angle of the steering wheel to the turning angle of the dirigible wheels and to the steering torque in the case of the embodiment shown in FIG. 1 being compared with the case of a conventional power steering.

Further in the power steering device of this embodiment, since the coil spring 24 and 25 in the coupling 14 operatively connecting the upper and lower parts 3a and 3b of the upper steering shaft 3 are applied with a predetermined set load by means of the adjustment screw 23 and the restricting means 28 (the stopper pins 26 and 27) so that a rotational displacement is produced between the upper and lower parts 3a and 3b only when the steering torque T of the steering wheel 1 exceeds a set value determined by the set load on the coil springs 24 and 25, the relation of the steering angle $\theta$ of the steering wheel to the steering torque T and the steering angle $\gamma$ of the front wheels when the vehicle speed and the rotating speed of the steering wheel are constant can be made as shown by the solid line A in FIG. 8 by setting the set load on the coil springs 24 and 25 near a predetermined steering torque $T_0$ corresponding to the resisting force, e.g., friction, of the steering linkage 8. In FIG. 8, the broken line B shows a similar relation in the steering device having the resilient means disclosed in U.S. Pat. No. 4,310,063 mentioned above and chain line C shows a similar relation in conventional power steering devices without the resilient means. As can be seen from FIG. 8, the free play angle of the steering wheel when the steering angle $\gamma$ of the front wheels is 0° is $\theta_2$ in the steering device of this embodiment, which is substantially the same as that in the conventional power steering device without resilient means and is smaller than that (angle $\theta_1$) in the steering device disclosed in the above U.S. Patent.

Thus, by applying a set load to the resilient means (coil springs 24 and 25), it is possible to minimize increase the inresponsive range of the steering due to the resilient means, whereby the steering response near the central portion of the steering range can be improved. Therefore, the front wheels 2 can quickly respond to even an operation of the steering wheel through a small angle. As a result, the steering response in compensating for external disturbances and the recovery characteristics of the front wheels when changing the running path during high speed traveling is improved whereby high running stability is obtained. In order to obtain higher running stability, the set load applied to the coil springs 24 and 25 is preferably slightly larger than the steering torque $T_0$ corresponding to the resisting force of the steering linkage 8.

Figure 9:
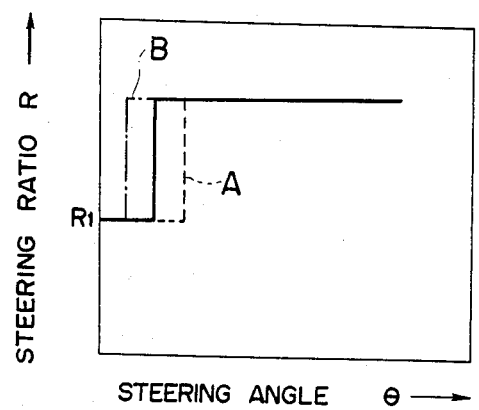
FIG. 9 is a graph showing the relation of the steering angle of the steering wheel to the steering ratio.

In the steering device of this embodiment wherein the set load is applied to the coil springs 24 and 25, the relation of the steering ratio to the steering angle $\theta$ of the steering wheel is as shown by the solid line in FIG. 9. As can be seen from FIG. 9, the steering ratio R is substantially equal to the steering ratio $R_1$ solely determined by the gear ratio in the steering gear 5 when the steering angle $\theta$ is very small since free play due to the elasticity of the resilient means (the coil springs 24 and 25 in this particular embodiment) is minimized by the set load.

In order to make the steering ratio variable according to the vehicle speed, torsion beams or rubber may be used as the resilient means instead of the coil springs 24 and 25. However, the coil springs 24 and 25 are preferred in that the acceptable range of elastic deformation is wider and therefore the steering ratio can be changed over a wider range. Although the set load applied to the coil springs 24 and 25 is a compressive load in the first embodiment, it may be a tensile load.

Figure 6:
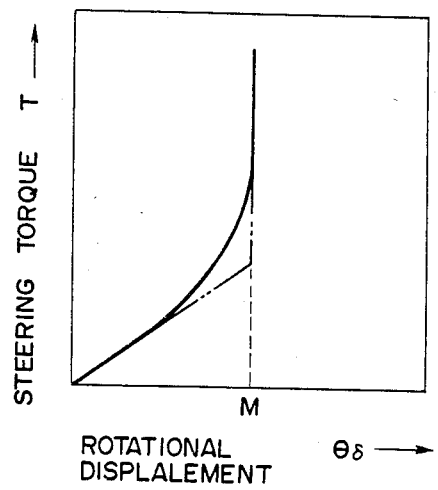
FIG. 6 is a graph showing the relation between the rotational displacement and the steering torque in the case of the steering device shown in FIG. 1.

The steering force of the steering wheel 1 is not so large in normal steering operation and accordingly the elastic deformation of the coil springs 24 or 25 is small. Therefore, the rotational displacement between the upper and lower parts 3a and 3b of the upper steering shaft 3 occurs within the sector cutaway portion 18 of the coupling body, i.e., the engaging pin 17 does not abut against the stopper shoulders 19 of the sector cutaway portion 18. When the steering wheel 1 is rotated with the vehicle at rest and without the assistance of the power assist or when the steering wheel 1 is sharply rotated to clear an obstruction in the road, for example, the steering torque T becomes large and the coil springs 24 or 25 is elastically deformed by a large amount, whereby the engaging pin 17 can abut against the stopper shoulder 19 to limit the rotational displacement $\theta_\delta$ between the upper and lower parts 3a and 3b of the upper steering shaft 3. If the spring characteristics of the coil springs 24 and 25 is linear, the relation between the rotational displacement and the steering torque will be as shown by the chained line in FIG. 6. That is, the steering torque T will increase linearly as the rotational displacement $\theta_\delta$ increases until the engaging pin 17 abuts against the stopper shoulder 19 of the sector cutaway portion 18 of the coupling body 16. The rotational displacement when the engaging pin 17 abuts against the stopper shoulders 19 is represented by the character M. When the engaging pin 17 abuts against the stopper shoulders 19, the steering torque T abruptly increases and the driver will feel a discontinuity in steering or the driver will feel an impact on the steering wheel. As described above, the spring characteristics of the coil springs 24 and 25 are non-linear in this embodiment. The solid line in FIG. 6 shows the relation between the rotational displacement $\theta_\delta$ and the steering torque T in the case of this embodiment. In the case of this embodiment, the increasing rate of the steering torque T becomes gradually larger as the rotational displacement $\theta_\delta$ approaches the upper limit M at which the engaging pin 17 abuts against the stopper shoulder 19. Therefore it is possible to reduce the discontinuous feeling which is given to the driver when the restraining means begins to act, i.e., when the engaging pin 17 abuts against the stopper shoulder 19 to limit the rotational displacement between the upper and lower parts 3a and 3b of the upper steering shaft 3 in order to prevent breakage of the coil springs 24 and 25. Further, since the rate of the steering torque gradually becomes larger in this embodiment, the rotational displacement angle $\theta_\delta$ is smaller in this embodiment than in the reference steering device in which the spring characteristics of the coil springs are linear, so long as the rotational displacement angle is smaller than the upper limit M. This means that the steering ratio in the former when the steering wheel is sharply rotated is smaller than that in the latter and the response of the front wheels upon sharp steering operation in the former is improved with respect to the latter.

Again referring to FIG. 3, the set load placed on the coil springs 24 and 25 can be changed by operating the adjustment screws 23. When the adjustment screws 23 are moved inwardly toward the spherical heads 17a of the engaging pin 17, the set load placed on the coil springs 24 and 25 is enlarged so that the coil springs 24 and 25 do not deform to produce the rotational displacement until the steering wheel 1 is rotated through a larger angle as shown by the broken line A in FIG. 9. In this case the steering ratio is kept at the small value $R_1$ over a larger angle, whereby quicker steering response is obtained, the steering ratio $R_1$ being the value which would be obtained if the coupling 14 were not provided. On the other hand, when the adjustment screws 23 are moved outward away from the heads 17a of the engaging pin 17, the set load is made smaller so that the coil springs 24 and 25 are deformed when the steering wheel is rotated through a relatively small angle as shown by the chained line B to increase the steering ratio. In this case the steering ratio is made larger than the value $R_1$ after rotating the steering wheel 1 through a relatively small angle, whereby oversteering during high speed travel can be effectively prevented.

Figure 10:
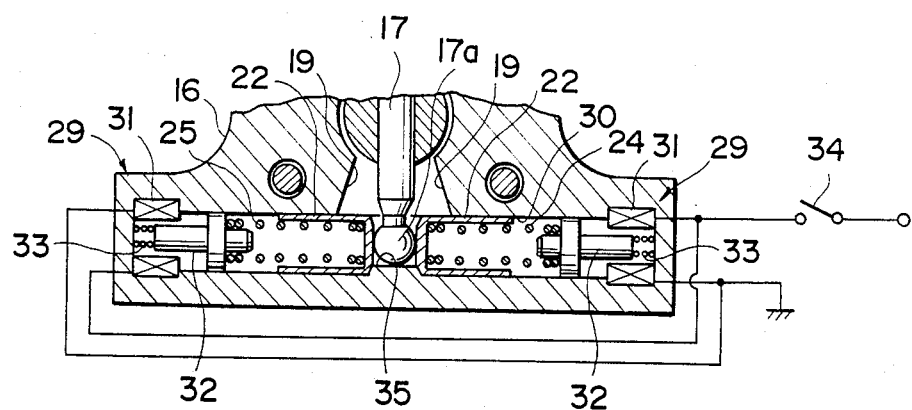
FIG. 10 is a fragmentary sectional view of another embodiment of the present invention wherein the adjustment means for controlling the set load placed on the coil springs is electrically actuated.

In another embodiment of the present invention shown in FIG. 10, the set load can be electrically changed. In FIG. 10, a solenoid 31 is provided on each end of the spring receiving bore 30. A pair of sliding members 32 are slidably inserted into the spring receiving bore 30 to be moved back and forth by the respective solenoids 31. The sliding members 32 abut against the outer ends of the first and second coil springs 24 and 25, respectively. The first and second coil springs 24 and 25 urge the collars 22 toward the spherical heads 17a of the engaging pin 17 in a manner similar to that in the first embodiment. In this embodiment, the restricting means is in the form of a stopper projection 35 formed integrally with the coupling body 16. The ends of the spring receiving bore 30 are closed by suitable means and the sliding members 32 are urged inwardly by supporting springs 33 interposed between the closed ends and the sliding members 32. The force of the supporting springs 33 is stronger than the coil springs 24 and 25 so that the sliding members 32 can be held in a predetermined position even when the resilient force of the coil springs 24 and 25 is exerted onto the sliding members 33 when the coil springs 24 and 25 are elastically deformed. The solenoids 31 are connected to a manual switch 34 disposed near the driver's sheet. When the manual switch 34 is closed, the solenoids 31 are energized to move the sliding members 32 outwardly away from the stopper projection 35 overcoming the force of the supporting springs 33. Thus, the set load placed on the coil springs 24 and 25 is large when the manual switch 34 is opened and is small when the manual switch 34 is closed.

Figure 11:
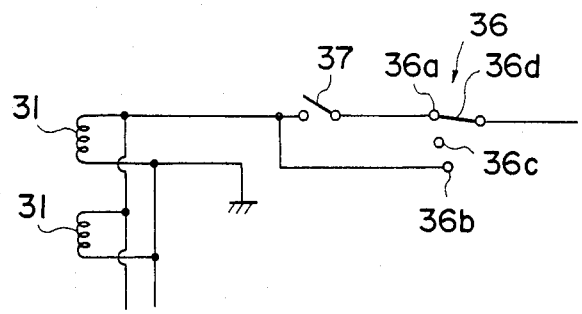
FIG. 11 is a modification of the electric circuit for actuating the adjustment means in the embodiment shown in FIG. 10.

FIG. 11 shows a modification of the electric circuit employed in the embodiment of FIG. 10. In this modification, a three-way switch 36 having first to third fixed contacts 36a to 36c and a movable contact 36d is used. The first fixed contact 36a is connected to the solenoids 31 by way of a vehicle speed sensitive switch 37, and the second fixed contact 36b is connected to the solenoids 31 in parallel to the vehicle speed sensitive switch 37. When the movable contact 36d is brought into contact with the third fixed contact 36c, the switch 36 is opened not to energize the solenoids 31. The vehicle speed sensitive switch 37 is automatically closed when the vehicle speed becomes higher than a predetermined value. Accordingly, when the movable contact 36d is in contact with the first fixed contact 36a, the solenoids 31 are automatically energized to reduce the set load on the coil springs 24 and 25 when the vehicle speed exceeds the predetermined value, while the solenoids 31 are not energized when the vehicle speed is not higher than the predetermined value. When the movable contact 36d is in contact with the second fixed contact 36b, the solenoids 31 are always energized to keep the set load on the coil springs 24 and 25 small. Further, when the movable contact 36d is in contact with the third fixed contact 36c, the set load is always kept large.

In the above embodiments, the elastic characteristics of the resilient means, i.e. the coil springs 24 and 25, are controlled by changing the set load placed thereon. In the embodiment shown in FIG. 12, the elastic characteristics of the resilient means are controlled by changing the spring constant thereof.

Figure 12:
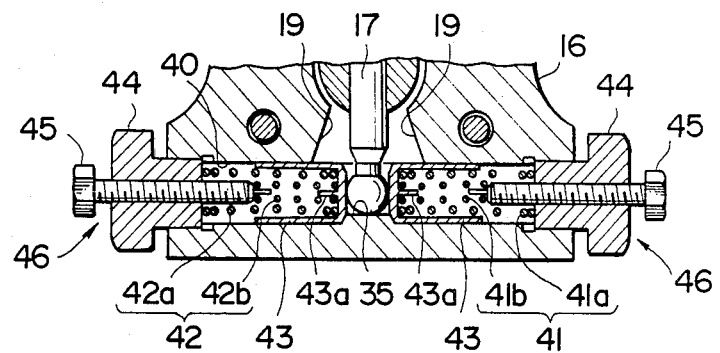
FIG. 12 is a fragmentary sectional view of still another embodiment of the present invention in which the spring constant of the resilient means is changed in three steps.

In FIG. 12, a first coil spring 41 comprises a large diameter coil spring 41a and a small diameter coil spring 41b coaxially received in the large diameter coil spring 41a. A collar 43 is slidably inserted into a spring receiving bore 40 in a manner similar to the collar 22 in the embodiment shown in FIG. 10. The collar 43 has a central projection 43a. The first coil spring 41 is received in the collar 43 so that the inner ends of the large diameter coil spring 41a and the small diameter coil spring 41b abut against the inner surface of the collar 43 with the central projection 43a of the collar 43 being received in the small diameter coil spring 41b. A large diameter adjustment screw 44 is screwed into the corresponding end of the spring receiving bore 40. The large diameter adjustment screw 44 is provided with a central threaded bore into which a small diameter adjustment screw 45 is screwed coaxially therewith with the inner end portion of the small diameter adjustment screw 45 projecting inwardly from the inner end surface of the larger diameter adjustment screw 44. The small diameter adjustment screw 45 is provided with a narrow extension inserted into the outer end portion of the small diameter coil spring 41b. Thus, the small diameter coil spring 41b is held coaxially with the large diameter coil spring 41a by the central projection 43a of the collar 43 and the extension of the small diameter adjustment screw 45. The large diameter coil spring 44 has a larger spring constant than the smaller diameter coil spring 45. The adjustment screws 44 and 45 constitute an adjustment means 46. A second coil spring 42 also comprises a large diameter coil spring 42a and a small diameter coil spring 42b and is held in place by the same arrangement. The operation of the second coil spring 42 is identical to the first coil spring 41 except that they are deformed by rotation of the engaging pin 17 in opposite directions. Therefore, operation of the first coil spring 41 only will be described hereinbelow.

Figure 13:
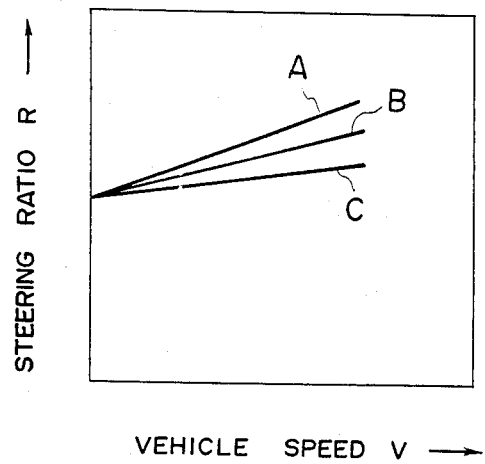
FIG. 13 is a graph showing three steering ratio characteristics obtained in the embodiment shown in FIG. 12.

The overall spring constant of the coil spring 41 can be changed in three steps. When the small diameter adjustment screw 45 is rotated to move inwardly to place a set load on the small diameter coil spring 41b and at the same time the large diameter adjustment screw 45 is rotated to move outwardly to make the larger diameter coil spring 41a free over the entire range of the rotational displacement, the spring constant of the first coil spring 41 solely depends upon the spring constant of the small diameter coil spring 41b. On the other hand, the spring constant of the coil spring 41 solely depends upon the spring constant of the larger diameter coil spring 41a when the small diameter adjustment screw 45 is moved outwardly and the large diameter adjustment screw 44 is moved inwardly. Further when both the small and large diameter adjustment screws 45 and 44 are moved inwardly, the set load is placed on both the small and large diameter coil springs 41b and 41a. The spring constant of the coil spring 41 is the largest in the last case and the smallest in the first case. Lines A to C in FIG. 13 show the spring ratio characteristics in the first to third cases. When sharp steering response during high speed traveling is desired, the small and large diameter adjustment screws 45 and 44 should be moved inwardly to place the set load on both the coil springs 41b and 41a, thereby obtaining the steering characteristics shown by the line C. On the other hand, when only the small diameter adjustment screw 45 is moved inwardly to place the set load on the small diameter coil spring 41b with the large diameter coil spring 41a being freed, the steering ratio during high speed traveling can be enlarged as shown by the line A, whereby oversteering during high speed driving can be effectively prevented.

If desired, the set load placed on the coil springs 41 and 42 may be changed by operating the adjustment means 46. Further, the adjustment means may be arranged to be actuated by solenoids under the control of a manual switch in a manner similar to the embodiments shown in FIGS. 10 and 11.

When coil springs having non-linear spring characteristics the spring constant of which increases with increase of the amount of deformation are used as the resilient means, the spring constant of the resilient means can be varied by changing the set load placed thereon, whereby both the features described in conjunction with FIGS. 9 and 13 can be obtained at the same time. As coil springs having non-linear spring characteristics, barrel shaped coil springs, hourglass shaped coil springs, conical coil springs, tapered coil springs and unequal pitch coil springs can be used, for example.

Figure 14:
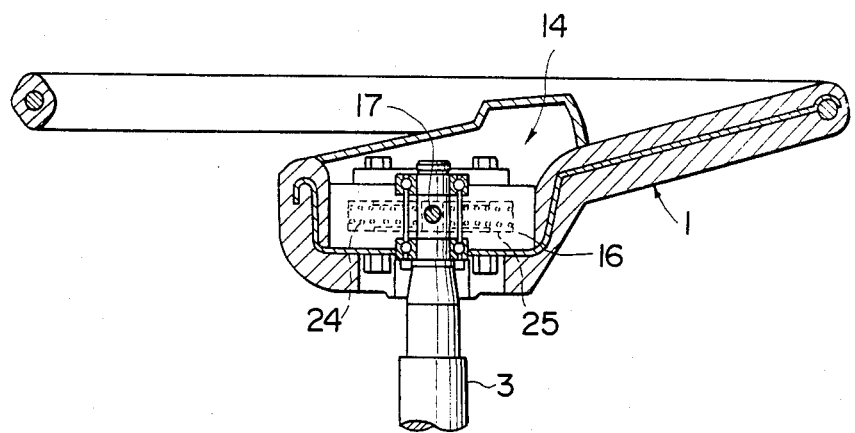
FIG. 14 is a fragmentary sectional view of still another embodiment of the present invention.

FIG. 14 shows still another embodiment of the present invention. This embodiment is similar to that shown in FIGS. 1 to 3 and therefore analogous parts are given like numerals in FIG. 14. In this embodiment, the coupling 14 is assembled into the steering wheel 1 to be rotated together therewith. In other words, the resilient means is inserted between the steering wheel 1 and the upper end of the upper steering shaft 3. The structure of the coupling 14 is substantially the same as that of the first embodiment shown in FIGS. 2 and 3 except that the engaging pin 17 is fixed to the upper end of the upper steering shaft 3 and the coupling body 16 receiving therein the first and second coil springs 24 and 25 is fixed to the steering wheel 1 to be rotated therewith in contrast to the same shown in FIGS. 2 and 3 in which the engaging pin 17 is rotated together with the steering wheel 1.

Although two pairs of coil springs, the coil springs in each pair being arranged to exert resiliency against rotation of the engaging pin in opposite directions, are used in the above embodiments, a single pair or more than two pairs of coil springs may be used. Further, the resilient means or the coupling 14 for producing the rotational displacement may be positioned at any place between the steering wheel and the power assist where the steering force of the steering wheel is transmitted as a rotary movement.

I claim:
1. A power steering device for vehicles comprising:
  a steering wheel;
  a steering linkage which operatively connects the steering wheel to dirigible wheels of the vehicle so that the dirigible wheels can be turned as the steering wheel is operated to steer the vehicle;
  a power assisting means inserted into the steering linkage to assist the steering force of the steering wheel, the steering linkage having a rotating portion which is rotated with the steering wheel to transmit the steering force of the steering wheel to the power assisting means and being divided into first and second parts;

a first extensible resilient member and a second extensible resilient member which are opposingly disposed between said first and second parts of the rotating portion to connect said first and second parts of the rotating portion with each other and which are adapted to be elastically deformed to produce a rotational displacement between the first and second parts when the steering wheel is rotated; and a restricting means for applying a set load to each of said first and second extensible resilient members and limiting the extension thereof, so that when one of the resilient members is compressed by a relative rotation between said first and second parts, the extension of the other is restricted so as to prevent the action of the set load thereof, whereby one of the resilient members is elastically deformed to produce the rotational displacement between said two parts only when the steering force from the steering wheel exceeds a predetermined value.

2. A power steering device as defined in claim 1 in which said restricting means comprises a respective pressure member for placing a predetermined pressure on each of said resilient members and a stopping means for stopping the resilient members against the pressure member; and said resilient members comprise coil spring members.

3. A power steering device as defined in claim 2 in which said first resilient member comprises a first coil spring member adapted to be elastically deformed by a rotation of the steering wheel in one direction and said second resilient member comprises a second coil spring member adapted to be elastically deformed by a rotation of the steering wheel in the other direction.

4. A power steering device as defined in claim 3 in which said coil spring members are disposed so that their central axes are in a plane substantially perpendicular to the rotational axis of said rotating portion.

5. A power steering device as defined in claim 4 in which said rotating portion is an upper steering shaft of the steering linkage, the upper steering shaft being divided into a steering wheel side half and a power assisting means side half, and said coil spring members are mounted in a coupling body which is fixed to one of the halves to be rotated together therewith and is positioned so that the coil spring members are adapted to be engaged with an engaging pin fixed to the other of the halves to rotate therewith in a plane perpendicular to the rotational axis of the upper steering shaft.

6. A power steering device as defined in claim 2 further comprising a restraining means for limiting said rotational displacement between said first and second parts to a predetermined angle and in which said coil spring members have non-linear spring characteristics, the spring constant increasing as the amount of the rotational displacement increases.

7. A power steering device as defined in claim 2 further comprising an adjustment means for changing the spring characteristics of the coil spring members.

8. A power steering device as defined in claim 7 in which said adjustment means changes said set load placed on the coil spring members.

9. A power steering device as defined in claim 8 in which said adjustment means comprises an adjustment screw.

10. A power steering device as defined in claim 8 in which said adjustment means comprises a sliding member movable back and forth along the central axis of the coil spring member and a solenoid which moves the sliding member away from the stopper member to reduce the set load on the coil spring member when energized, said sliding member being urged toward the stopper member by a spring member the force of which is stronger than that of the coil spring member.

11. A power steering device as defined in claim 7 in which said adjustment means changes the spring constant of the coil spring members.

12. A power steering device as defined in claim 11 in which each said coil spring member comprises a first coil spring and a second coil spring coaxially received in the first coil spring, the spring characteristics of the first and second coil springs being different from each other, and said adjustment means comprises means for placing set loads on the first and second coil springs independently from each other.

* * * * *